(12) United States Patent
Yokota

(10) Patent No.: US 7,078,841 B2
(45) Date of Patent: Jul. 18, 2006

(54) MAGNETO-GENERATOR

(75) Inventor: Hirohisa Yokota, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 723 days.

(21) Appl. No.: 10/288,454

(22) Filed: Nov. 6, 2002

(65) Prior Publication Data

US 2003/0222520 A1 Dec. 4, 2003

(30) Foreign Application Priority Data

May 16, 2002 (JP) .......................... 2002-141485

(51) Int. Cl.
*H02K 21/22* (2006.01)

(52) U.S. Cl. ............................................. 310/153
(58) Field of Classification Search ................. 310/153, 310/156.08, 156.01, 74; 74/572
See application file for complete search history.

(56) References Cited

U.S. PATENT DOCUMENTS

| | | | | |
|---|---|---|---|---|
| 3,551,711 | A | * 12/1970 | Davis ........................... | 310/43 |
| 4,306,167 | A | * 12/1981 | Tomite et al. ............... | 310/153 |
| 4,701,654 | A | * 10/1987 | Tatukawa et al. ........... | 310/153 |
| 5,179,872 | A | * 1/1993 | Pernice ........................ | 74/572 |
| 6,429,564 | B1 | * 8/2002 | Uemura et al. .............. | 310/153 |
| 6,614,140 | B1 | * 9/2003 | Uemura et al. ......... | 310/156.12 |
| 6,661,132 | B1 | * 12/2003 | Kobayashi ................... | 310/51 |

FOREIGN PATENT DOCUMENTS

| | | |
|---|---|---|
| JP | 53-083611 U | 7/1978 |
| JP | 55-010333 U | 1/1980 |
| JP | 56-108355 U | 8/1981 |
| JP | 57-118669 U | 7/1982 |
| JP | 04-121380 U | 10/1992 |
| JP | 10-191593 A | 7/1998 |

\* cited by examiner

*Primary Examiner*—Darrren Schuberg
*Assistant Examiner*—Heba Elkassabgi
(74) *Attorney, Agent, or Firm*—Sughrue Mion, PLLC

(57) ABSTRACT

A magneto-generator capable of suppressing temperature rise of an armature winding and ensuring an improved electricity generation efficiency includes a flywheel having a cylindrical peripheral wall formed with a flat bottom wall at one end thereof, a plurality of magnets disposed on and along an inner peripheral surface of the cylindrical peripheral wall, a generator coil disposed internally of the flywheel in opposition to the magnets for generating electricity under electromagnetic induction taking place between the magnets and the generator coil, ventilating through-holes formed in a joined portion of the cylindrical peripheral wall and the flat bottom wall so as to extend partially through both of them, and upstanding fins disposed on the bottom wall for generating forced air flows from interior to exterior of the flywheel through the ventilating through-holes upon rotation of the flywheel.

6 Claims, 4 Drawing Sheets

MAGNETO-GENERATOR

BACKGROUND OF THE INVENTION

1. Field of the Invention

The present invention relates to a magneto-generator for generating electric energy under the action of electromagnetic induction taking place between magnets mounted on a flywheel and an armature winding through rotation of the flywheel.

2. Description of Related Art

For having better understanding of the concept underlying the present invention, description will first be made of a conventional flywheel type magneto-generator by reference to FIGS. 6 and 7 of the accompanying drawings, in which FIG. 6 is a top plan view showing partially in section a rotor of a conventional flywheel type magneto-generator which is disclosed, for example, in Japanese Utility Model Laid-Open Publication No. 121380/1992, and FIG. 7 is a vertical sectional view of the same taken along a line VII—VII shown in FIG. 6 as viewed in the direction indicated by arrows.

Referring to the figures, a rotor of the magneto-generator includes a flywheel 1 implemented in a substantially bowl-like shape (hereinafter also referred to as the bowl-shaped flywheel only for the convenience of description), four magnets 2 mounted on the inner peripheral surface of the flywheel 1 with equidistance therebetween in the circumferential direction, a guard ring 3 of a substantially cylindrical shape which is formed by drawing a sheet metal and closely or tightly fit onto the inner surfaces of the magnets 2 which are disposed substantially in an annular array, a magnet securing resin 4 filled in the space defined between the flywheel 1 and the guard ring 3 at both sides and between the adjacent end portions of the individual magnets 2 for fixedly securing the magnets 2 and the guard ring 3 to the flywheel 1 in a so-called integrated structure, a hub or boss 5 formed in the flywheel 1 at a center portion of a bottom wall 1a for coupling the flywheel to a rotatable shaft (not shown), and a plurality of fins 4a disposed on the bottom wall 1a of the flywheel 1 with equidistance along the inner circumferential surface of the guard ring 3 for the purpose of generating air currents (also referred to as airflow or currents of gas or the like) for cooling a generator coil (not shown) disposed internally of the flywheel 1.

In the magneto-generator of the structure described above, the flywheel 1 is caused to rotate upon rotation of the rotatable shaft (not shown) coupled to the boss 5, whereby electric energy or electricity is generated under the action of electromagnetic induction taking place between the magnets 2 and the generator coil (not shown) disposed internally of the flywheel 1.

In accompanying to the rotation of the flywheel 1, the fins 4a disposed on the bottom wall 1a of the flywheel 1 rotate for thereby agitating a gas (air) existing within the interior space of the flywheel 1, as a result of which the generator coil (not shown) heated, for example, due to a core loss is cooled.

In the conventional magneto-generator of the structure described above, the gas or air existing internally of the flywheel 1 can certainly be agitated. However, no ventilation holes (air holes) are formed in the flywheel 1. Besides, no flow can forcibly be brought about in the gas or air existing externally of the flywheel 1. For these reasons, ventilation internal of the flywheel 1 can not sufficiently be effectuated in the conventional magneto-generator.

On the other hand, the armature winding serving as the generator coil undergoes heating in proportion to the square of the current generated. Thus, when exchange of the heated gas is not adequately effected due to poor ventilation as mentioned above, then the electrical resistance of the winding increases due to temperature rise thereof, which results in lowering of the efficiency of electricity generation, giving rise to a problem.

SUMMARY OF THE INVENTION

In the light of the state of the art described above, it is an object of the present invention to provide a magneto-generator in which temperature rise of the armature winding serving as the generator coil can positively be suppressed by bringing about effective ventilation internally of the flywheel while generating airflows (air currents) externally of the flywheel with high efficiency to thereby effectively prevent the efficiency of electricity generation from being lowered.

In view of the above and other objects which will become apparent as the description proceeds, there is provided according to a general aspect of the present invention a magneto-generator which includes a flywheel having a cylindrical peripheral wall and a flat bottom wall which closes the cylindrical peripheral wall at one end thereof, a plurality of magnets disposed on and along an inner peripheral surface of the cylindrical peripheral wall of the flywheel, and a generator coil disposed internally of the flywheel in opposition to the magnets for generating electricity under the action of electromagnetic induction taking place between the magnets and the generator coil. The magneto-generator further includes ventilating through-holes formed in a joined portion between the cylindrical peripheral wall and the flat bottom wall of the flywheel so as to extend in continuation partially through both the cylindrical peripheral wall and the flat bottom wall, and a plurality of upstanding fins disposed on the flat bottom wall for generating forced air currents flowing from the interior to the exterior of the flywheel by way of the ventilating through-holes upon rotation of the flywheel to thereby cool the generator coil.

By virtue of the structure of the magneto-generator described above, temperature rise of the generator coil can positively be suppressed with high efficiency owing to ventilation effected internally of the flywheel as well as airflows generated externally from the flywheel, whereby lowing of the electricity generation efficiency due to temperature rise of the generator coil can effectively be suppressed.

Further, the fins can be installed inexpensively without need for any additional step of forming the fins in the process for manufacturing the rotor.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. Also in the following description, it is to be understood that such terms as "top", "bottom", "vertical", "lower", "upstanding" and the like are words of convenience and are not to be construed as limiting terms.

Embodiment 1

Figure 1:
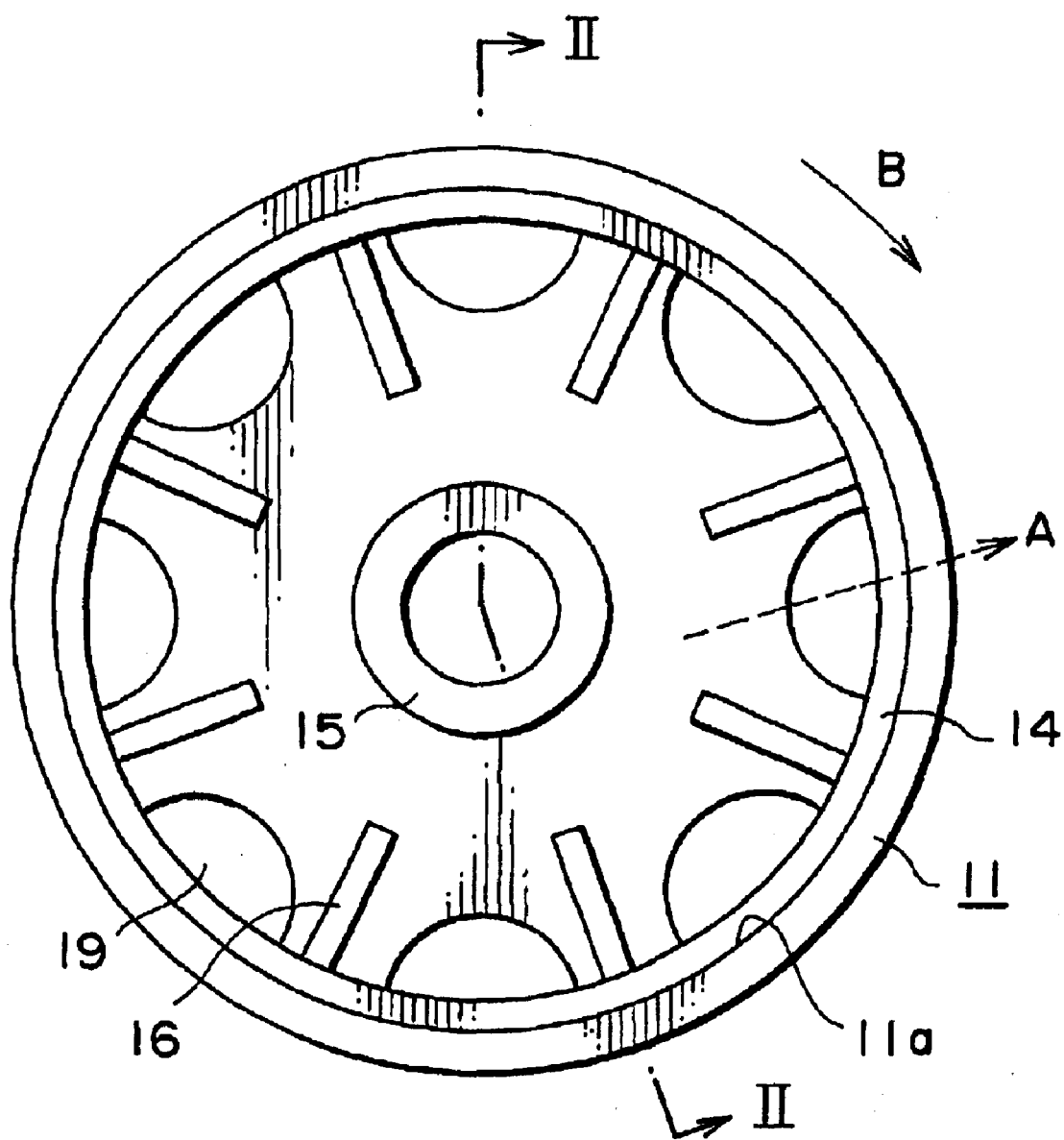
FIG. 1 is a top plan view showing partially in section a structure of a rotor of a magneto-generator according to a first embodiment of the invention.
Figure 2:
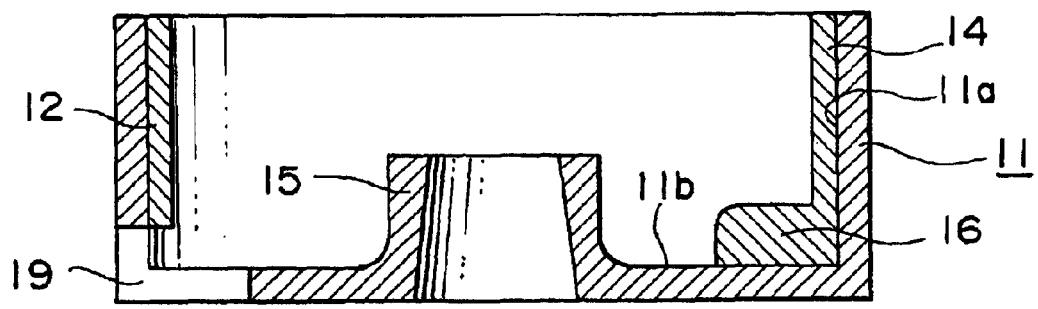
FIG. 2 is a vertical sectional view of the same taken along a line II—II shown in FIG. 1 and viewed in the direction indicated by arrows.
Figure 6:
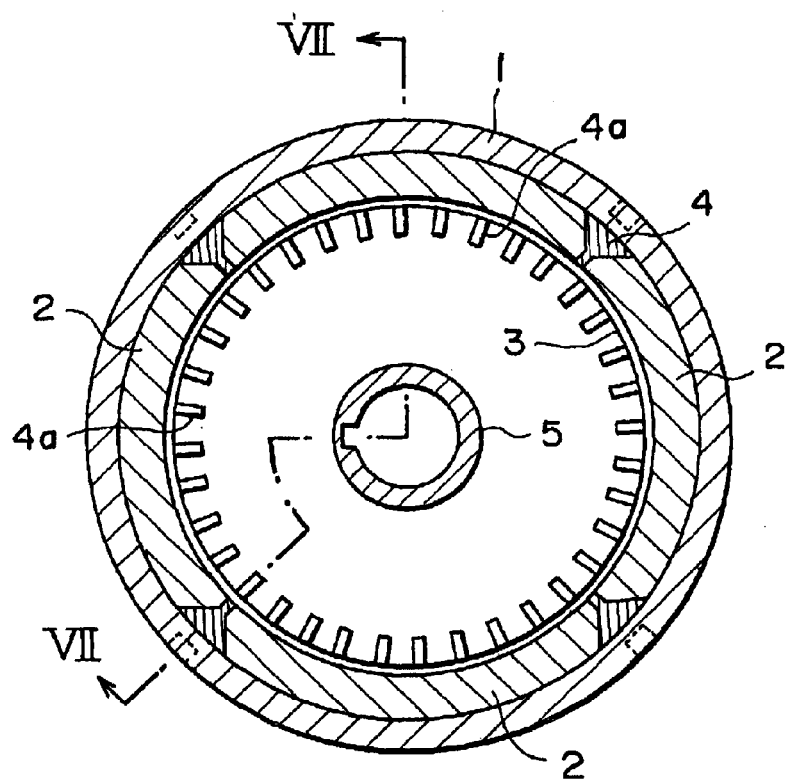
FIG. 6 is a top plan view showing partially in section a rotor of a conventional flywheel type magneto-generator.
Figure 7:
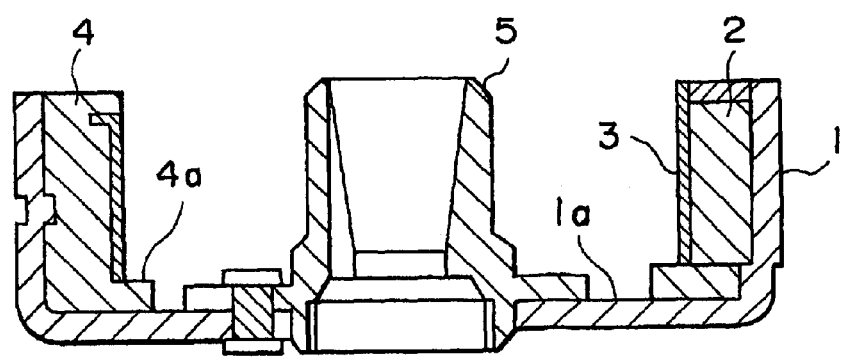
FIG. 7 is a vertical sectional view of the same taken along a line VII—VII shown in FIG. 6 and viewed in the direction indicated by arrows.

FIG. 1 is a top plan view showing schematically a rotor of a magneto-generator according to a first embodiment of the present invention. FIG. 2 is a vertical sectional view of the same taken along a line II—II shown in FIG. 1 and viewed in the direction indicated by attached arrows. Referring to FIG. 1, the rotor of the magneto-generator according to the instant embodiment of the invention includes a substantially bowl-shaped flywheel 11 which is composed of a substantially cylindrical peripheral wall 11a and a flat bottom wall 11b formed integrally with the substantially cylindrical peripheral wall 11a so as to close one end thereof while leaving the other end opened. Formed at a center of the flat bottom wall 11b of the flywheel 11 is a hub or boss 15 which is used for coupling the rotor to a rotatable shaft such as e.g. a crank shaft (not shown) of an internal combustion engine (not shown either). Further, plural magnets (four magnets in the illustrated example) 12 each having an arcuate cross-section are circumferentially disposed in a circular array on the inner peripheral surface of the cylindrical peripheral wall 11a, of the flywheel 11, similarly to the rotor of the conventional magneto-generator described hereinbefore by reference to FIGS. 6 and 7.

As described above, a plurality of (e.g. four) magnets 12 each having an arcuate cross-section are disposed in close or tight contact with the inner peripheral surface of the cylindrical peripheral wall 11a of the flywheel 11 in the circumferential direction. These magnets 12 are disposed in an annular array with equidistance therebetween along the whole circumference of the cylindrical peripheral wall 11a.

The plural magnets 12 are fixedly secured to the flywheel 11 by a magnet protecting resin 14 filled in the peripheral spaces appearing around the individual magnets 12. The magnet protecting resin 14 serves for fixedly securing the magnets 12 to the flywheel 11 and at the same time protecting the magnets 12 against possible injury.

More specifically, the magnet protecting resin 14 is formed in a proper structure meeting the requirements mentioned above by using a resin molding die (not shown), whereon the magnets 12 are mounted in the resin structure, which is then inserted in the flywheel 11 to be fixedly secured thereto. To this end, the resin structure formed by using the resin molding die is provided with magnet accommodating or fitting recesses (not shown) in the outer peripheral surface, whereon the magnets 12 are then fixedly embedded in the recesses, respectively. Subsequently, the magnet protecting resin assembly 14 having the magnets 12 mounted integrally is disposed in the inner hollow space of the flywheel 11 and fixedly secured thereto at a proper position. In this way, the magnets 12 can fixedly be positioned properly on the inner peripheral surface of the flywheel 11.

A plurality of ventilating through-holes 19 are formed in a joined portion of a substantially L-shaped cross-section formed between the flat bottom wall 11b and the peripheral wall 11a of the flywheel 11, as can clearly be seen in FIG. 2. The plural ventilating through-holes 19 are provided in the L-shaped joined portion with equidistance therebetween along the whole circumference thereof. In the magneto-generator now under consideration, eight ventilating through-holes 19 are disposed with an angular distance of 45 degrees between adjacent ones so as to extend partially through both the flat bottom wall 11b and the cylindrical peripheral wall 11a (see FIG. 2). In this conjunction, the portion of the ventilating through-hole 19 formed in the flat bottom wall 11b should preferably be formed in a semi-circular shape, while the portion of the ventilating through-hole 19 formed in the cylindrical peripheral wall 11a in continuation to the semi-circular hole portion should preferably be formed substantially in a rectangular shape.

Disposed between two adjacent ones of the ventilating through-holes 19 is a fin 16 at the joined portion of the L-shaped cross-section between the flat bottom wall 11b and the cylindrical peripheral wall 11a of the flywheel 11. More specifically, the fin 16 is formed substantially of a rectangular flat plate and has one side edge connected to the flat bottom wall 11b while another side edge is connected to the cylindrical peripheral wall 11a. In this manner, the fins 16 are disposed in a substantially radial pattern at the joined portion of the L-shaped cross-section so that the fins 16 and the ventilating through-holes 19 are disposed alternatively with each other in the circumferential direction of the flywheel 11.

In conjunction with fabrication of the fins 16, cavities for forming the fins 16 may previously be formed in a resin molding die (not shown) used for forming the magnet protecting resin member 14 so that the fins 16 can be formed at the flat bottom wall 11b of the flywheel 11 concurrently with formation of the magnet protecting resin 14. In that case, the fins 16 can be fabricated inexpensively because no additional step of forming the fins is required in the process for manufacturing the rotor.

As is apparent from the foregoing, the magneto-generator to which the first embodiment of the present invention is directed includes the flywheel 11 having the cylindrical peripheral wall 11a and the flat bottom wall 11b which closes the cylindrical peripheral wall 11a at one end thereof, a plurality of magnets 12 disposed on and along the inner peripheral surface of the cylindrical peripheral wall 11a of the flywheel 11, and the generator coil (armature winding 18 shown in FIG. 3) disposed internally of the flywheel 11 in opposition to the magnets 12 for generating electricity under the action of electromagnetic induction taking place between the magnets 12 and the generator coil. The magneto-generator according to the teaching of the present invention incarnated in the first embodiment thereof includes the ventilating through-holes 19 formed in a joined portion between the cylindrical peripheral wall 11a and the flat bottom wall 11b of the flywheel 11 so as to extend in continuation partially through both the cylindrical peripheral wall 11a and the flat bottom wall 11b, and a plurality of upstanding fins 16 disposed on the flat bottom wall 11b for generating forced air currents (gas flows or streams) flowing from the interior to the exterior of the flywheel 11 by way of the ventilating through-holes 19 upon rotation of the flywheel 11 to thereby cool the generator coil (armature winding 18).

Figure 3:
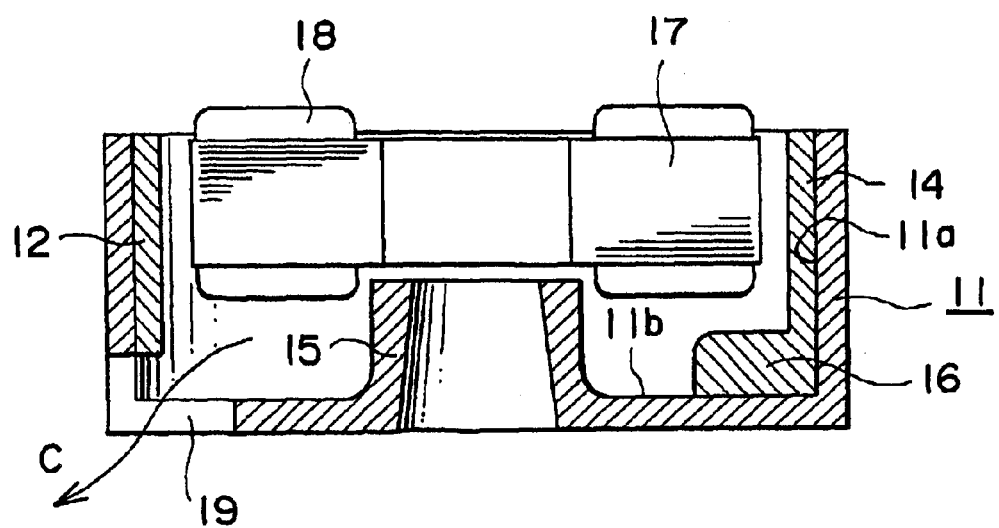
FIG. 3 is a side elevational view showing partially in section a flywheel constituting a rotor together with an armature.

Referring to FIG. 1, when the flywheel 11 is rotated in the direction indicated by an arrow B, air currents are generated in the direction indicated by the arrow A. In other words, the air currents flow in the direction from the inside of the flywheel 11 to the outside thereof. FIG. 3 is a side elevational view showing partially in section the flywheel 11 together with an armature 17 disposed in opposition to the flywheel 11. As can be seen in FIG. 3, when the air currents are generated in the direction A as mentioned above, there are also generated the air currents which flow in the direction indicated by arrows C to thereby sweep the surface of the armature winding 18 which constitutes the generator coil. Thus, the temperature rise of the armature winding 18 due to heat generation brought about by the armature current can be suppressed, which in turn contribute to preventing the electricity generation efficiency of the magneto-generator from being lowered.

As the flywheel 11 rotates, difference in the air pressure is brought about between the interior and the exterior of the flywheel 11 under the action of the ventilating through-holes 19 formed partially across the flat bottom wall 11b and the cylindrical peripheral wall 11a of the flywheel 11 and the fins 16 of resin provided on the flat bottom wall 11b of the flywheel 11. As a result of this, the air currents are generated internally of the flywheel 11, whereby the outer surface of the armature winding 18 serving as the generator coil is cooled.

Further, under the difference in pressure brought about by the fins 16 between the interior and the exterior of the flywheel 11 upon rotation thereof, the gas flow or air current is also induced within the flywheel 11 in the direction indicated by an arrow C in FIG. 3 by way of the ventilating through-holes 19, whereby the exposed surface of the armature winding 18 serving as the generator coil is effectively cooled.

The magneto-generator according to the instant embodiment of the invention features the ventilating through-holes 19 formed partially across both the flat bottom wall 11b and the cylindrical peripheral wall 11a of the flywheel 11 in combination with the fins 16 formed on the flat bottom wall 11b of the flywheel 11. By virtue of this feature, the air currents can be produced with high efficiency, whereby the armature winding 18 disposed internally of the flywheel 11 can be cooled effectively. Thus, the temperature rise of the armature winding 18 can effectively be suppressed, which in turn contributes to preventing the electricity generation efficiency of the magneto-generator from degradation.

Further, in the magneto-generator according to the instant embodiment of the invention, the gas flows or air currents are forcibly generated through cooperation of the ventilating through-holes 19 formed continuously across the cylindrical peripheral wall 11a and the flat bottom wall 11b and the fins 16d is posed on the flat bottom wall 11b upon rotation of the flywheel 11. Owing to such air currents, the lower surface of the armature winding 18 serving as the generator coil, as viewed in FIG. 3, is protected against temperature rise. Thus, the electricity generation efficiency of the magneto-generator can effectively be protected from degradation.

Furthermore, since the air pressure within the flywheel 11 is caused to change due to the air flows or currents forcibly brought about internally of the flywheel 11, the air housed within the flywheel 11 is forcibly discharged therefrom while being agitated, which is very effective for suppressing the temperature rise of the armature winding 18 serving as the generator coil and hence preventing degradation of the electricity generation efficiency of the magneto-generator.

Furthermore, in the magneto-generator according to the instant embodiment of the invention, the peripheral space surrounding the magnets 12 are filled with the resin 14 for the purpose of fixedly positioning the magnets 12 relative to the flywheel 11 and at the same time protecting the magnets 12 against possible injury. In that case, the fins 16 can be formed of the resin concurrently with the formation of the magnet protecting resin 14. Thus, the fins 16 can be provided inexpensively because no additional step of forming the fins is required in the process for manufacturing the rotor.

Although the foregoing description has been made on the assumption that the fin 16 is made of a flat plate of a substantially rectangular shape and that the fin 16 is secured to the cylindrical peripheral wall 11a at one side while being secured to the flat bottom wall 11b at another side, it should be appreciated that the fin 16 may be fixedly mounted only on the flat bottom wall 11b in the upstanding posture substantially to the same effect.

Embodiment 2

Figure 4:
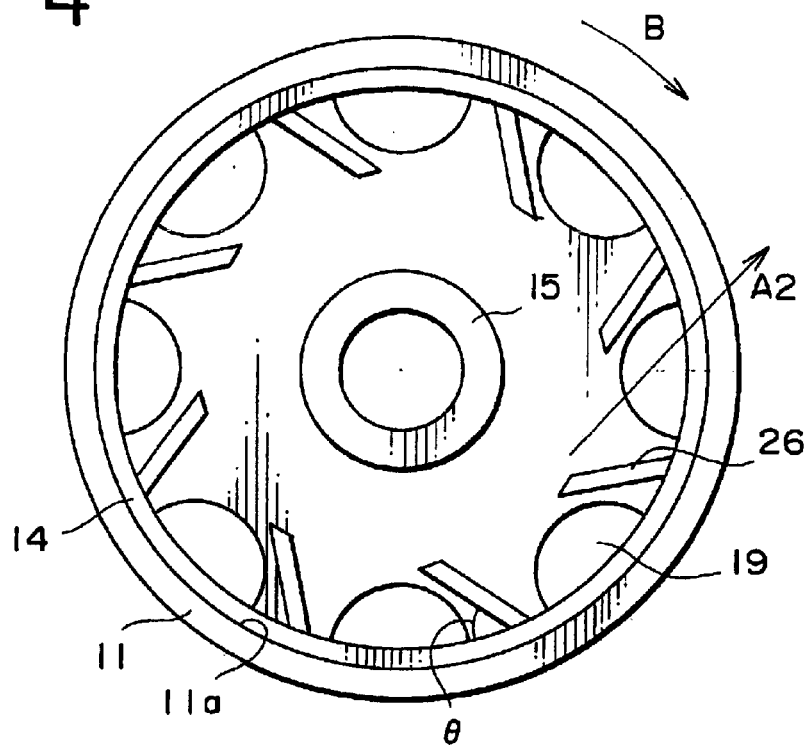
FIG. 4 is a top plan view showing partially in section a structure of a flywheel serving as a rotor of a magneto-generator according to a second embodiment of the invention.

FIG. 4 is a top plan view showing partially in section a rotor of a magneto-generator according to a second embodiment of the present invention. In the magneto-generator according to the instant embodiment of the invention, fins denoted by reference numeral 26 are disposed with inclination, as can be seen in FIG. 4. In this conjunction, it is to be added that by adjusting the angle θ formed between the fin 26 and the inner peripheral surface of the flywheel 11 as shown in FIG. 4, the effect or action of the air currents or flows can be regulated.

In the magneto-generator of the structure described above, the fin 26 can trap the gas or air more positively because the fin is disposed with a predetermined angle θ of inclination relative to the inner peripheral surface of the flywheel 11, whereby the forced air currents can be generated with enhanced efficiency.

Embodiment 3

Figure 5:
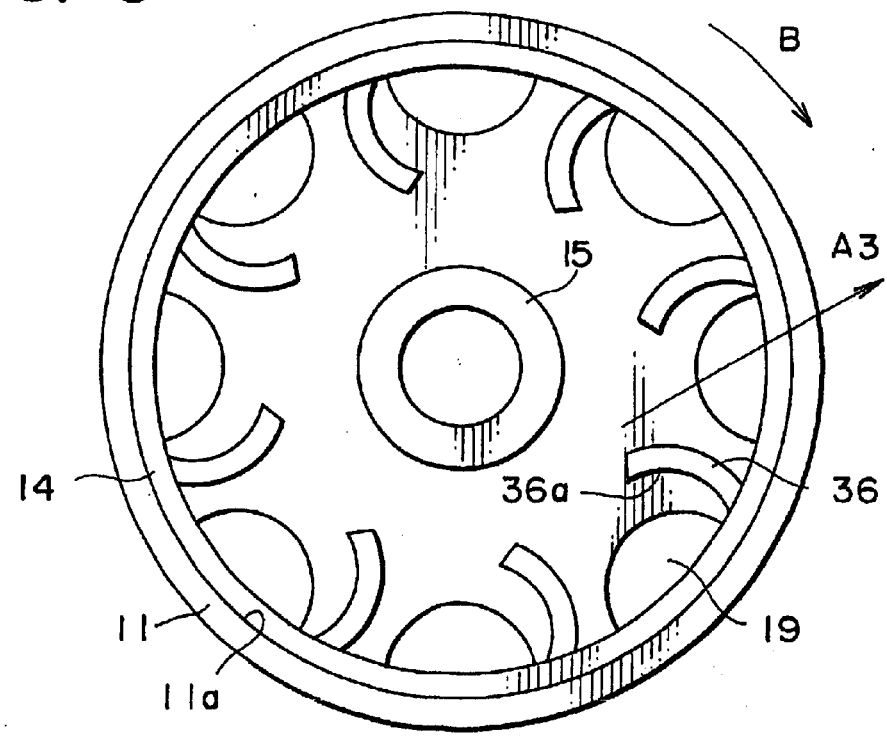
FIG. 5 is a top plan view showing partially in section a structure of a flywheel serving as a rotor of a magneto-generator according to a third embodiment of the invention.

FIG. 5 is a plan view showing partially in section a rotor of the magneto-generator according to a third embodiment of the present invention. In the case of the magneto-generator according to the instant embodiment of the invention, each of the fins 36 is implemented in an arcuate shape in cross-section, as can clearly be seen in FIG. 5. More specifically, the side surface of the fin 36 onto which the gas or air impinges when the flywheel 11 rotates in the direction indicated by an arrow B shown in FIG. 5 is formed arcuately concavely. In other words, the fin 36 presents a surface 36a curved concavely in the rotating direction of the rotor. Thus, the gas or air can be trapped by the fins more positively, whereby the forced gas flows A3 can be generated with enhanced efficiency.

In the magneto-generator according to the second embodiment of the invention, the fin 26 is disposed with inclination, while in the magneto-generator according to a third embodiment of the present invention, the fin 36 is imparted with a surface curved concavely as viewed in the rotating direction of the rotor. In this conjunction, the fin 36 having the curved surface may be disposed with inclination relative to the inner peripheral surface of the flywheel.

Furthermore, in conjunction with the first to third embodiments, it has been described that the magnets are fixedly secured to the flywheel 11 by using the magnet protecting resin 14. It should however be appreciated that the invention is never restricted to such magnet securing method. It is self-explanatory that the magnets can equally be secured to the flywheel 11 by resorting to any other appropriate method such as, for example, bonding by using an adhesive.

Effects of the Invention

The present invention has provided the magneto-generator which includes the flywheel having the cylindrical peripheral wall and the flat bottom wall which closes the cylindrical peripheral wall at one end thereof, a plurality of magnets disposed on and along the inner peripheral surface of the cylindrical peripheral wall of the flywheel, and the generator coil disposed internally of the flywheel in opposition to the magnets for generating electricity under the action of electromagnetic induction taking place between the magnets and the generator coil. The magneto-generator further includes ventilating through-holes formed in the joined portion between the cylindrical peripheral wall and the flat bottom wall of the flywheel so as to extend in continuation partially through both the cylindrical peripheral wall and the flat bottom wall, and a plurality of upstanding fins disposed on the flat bottom wall for generating forced air currents flowing from the interior to the exterior of the flywheel by way of the ventilating through-holes upon rotation of the flywheel to thereby cool the generator coil.

By virtue of the structure of the magneto-generator described above, ventilation of the inner space of the flywheel as well as generation of external air flows can be effectuated with high efficiency, whereby temperature rise of the generator coil and hence degradation of the electricity generation efficiency can satisfactorily be suppressed. Further, since the ventilating through-holes are formed across the bottom wall and the peripheral wall of the flywheel, the ventilating through-holes can be realized with a large opening area, as a result of which substantially linear air streams can be generated, which flow smoothly from the interior to the exterior of the flywheel. Thus, the gas or air resident in the flywheel can be discharged with high efficiency.

In the magneto-generator described above, the magneto-generator can further include the magnet protecting resin filled in the peripheral space surrounding the magnets for fixedly securing the magnets to the flywheel and protecting the magnets. In that case, the fins can be formed concurrently with formation of the magnet protecting resin.

Owing to the arrangement mentioned above, the fins can be fabricated inexpensively because no additional step of forming the fins is required in the process for manufacturing the rotor.

Further, in the magneto-generator of the arrangement described above, the fin may be disposed with the predetermined angle of inclination relative to the inner peripheral surface of the flywheel.

Thus, the gas or air can be trapped by the fins more positively, whereby the forced gas flows can be generated with enhanced efficiency.

Furthermore, in the magneto-generator described above, the fin can be so configured as to present the concavely curved side surface in the rotating direction of the flywheel.

With this structure, the gas (air) can be trapped by the fins more positively, whereby the forced gas flows (air currents) can be generated with much enhanced efficiency.

Moreover, in the magneto-generator described above, the magnet protecting resin structure can be formed with recesses for accommodating therein the magnets, respectively, when the magnet protecting resin structure is formed through molding, and the magnet protecting resin structure can be mounted internally of the flywheel after the magnets have been mounted within the recesses, respectively.

With this structure, the recesses for mounting the magnets, respectively, can easily be formed, whereby the magnets can be fixedly secured to the inner peripheral surface of the flywheel through a very simple procedure.

Many modifications and variations of the present invention are possible in the light of the above techniques. It is therefore to be understood that within the scope of the appended claims, the invention may be practiced otherwise than as specifically described.

What is claimed is:

1. A magneto-generator, comprising:
    a flywheel having a cylindrical peripheral wall and a flat bottom wall which closes said cylindrical peripheral wall at one end thereof;
    a plurality of magnets disposed on and along an inner peripheral surface of said cylindrical peripheral wall of said flywheel;
    a generator coil disposed internally of said flywheel in opposition to said magnets for generating electricity under the action of electromagnetic induction taking place between said magnets and said generator coil;
    ventilating through-holes formed in a joined portion between said cylindrical peripheral wall and said flat bottom wall of said flywheel so as to extend in continuation partially through both said cylindrical peripheral wall and said flat bottom wall; and
    a plurality of upstanding fins disposed on said flat bottom wall for generating forced air currents flowing from interior to exterior of said flywheel by way of said ventilating through-holes upon rotation of said flywheel to thereby cool said generator coil.

2. A magneto-generator according to claim 1, further comprising:
    a magnet protecting resin filled in a peripheral space surrounding said magnets for fixedly securing said magnets relative to said flywheel and protecting said magnets,
    wherein said fins are formed concurrently with formation of said magnet protecting resin.

3. A magneto-generator according to claim 2,
    wherein said magnet protecting resin structure is formed with recesses for accommodating therein said magnets, respectively, when said magnet protecting resin structure is formed through molding, and said magnet protecting resin structure is mounted internally of said flywheel after said magnets have been mounted within said recesses, respectively.

4. A magneto-generator according to claim 1,
    wherein said fin is disposed with a predetermined angle of inclination relative to said inner peripheral surface of said flywheel.

5. A magneto-generator according to claim 1,
    wherein said fin presents a concavely curved side surface in a direction in which said flywheel rotates.

6. A magneto-generator according to claim 1,
    wherein said plurality of ventilating through-holes and said plurality of fins are disposed each in an annular array with said ventilating through-holes and said fins alternating with each other.

* * * * *